(12) United States Patent
Nakamura et al.

(10) Patent No.: US 9,354,862 B2
(45) Date of Patent: May 31, 2016

(54) APPARATUS AND METHOD FOR SOFTWARE INFORMATION MANAGEMENT

(71) Applicant: FUJITSU LIMITED, Kawasaki-shi, Kanagawa (JP)

(72) Inventors: Katsuaki Nakamura, Kawasaki (JP); Taisuke Aizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/738,008

(22) Filed: Jun. 12, 2015

(65) Prior Publication Data

US 2015/0363189 A1    Dec. 17, 2015

(30) Foreign Application Priority Data

Jun. 16, 2014    (JP) .................................. 2014-123206

(51) Int. Cl.
*G06F 9/44*    (2006.01)
*G06F 9/445*    (2006.01)
*H04L 12/26*    (2006.01)

(52) U.S. Cl.
CPC .. *G06F 8/65* (2013.01); *G06F 8/61* (2013.01); *H04L 43/08* (2013.01)

(58) Field of Classification Search
CPC ........................................................ G06F 8/65
See application file for complete search history.

(56) References Cited

U.S. PATENT DOCUMENTS

| | | | | |
|---|---|---|---|---|
| 7,461,086 B1* | 12/2008 | Hurren | ....................... | G06F 8/61 |
| 7,945,897 B1* | 5/2011 | Cook | ....................... | G06F 9/445 |
| | | | | 709/226 |
| 8,181,247 B1* | 5/2012 | Pavlyushchik | ........ | G06F 21/552 |
| | | | | 726/22 |
| 8,843,903 B1* | 9/2014 | Blaser | ....................... | G06F 8/61 |
| | | | | 717/135 |
| 2001/0013024 A1 | 8/2001 | Takahashi et al. | | |
| 2007/0245344 A1* | 10/2007 | Kumagai | ................... | G06F 8/65 |
| | | | | 717/174 |
| 2015/0156202 A1* | 6/2015 | Clark | ....................... | G06F 21/60 |
| | | | | 726/4 |

FOREIGN PATENT DOCUMENTS

| | | |
|---|---|---|
| JP | 2001-222424 | 8/2001 |
| JP | 2004-502236 | 1/2004 |
| JP | 2007-334821 | 12/2007 |
| JP | 2011-197849 | 10/2011 |
| WO | 02/01350 | 1/2002 |

* cited by examiner

*Primary Examiner* — Philip Wang
(74) *Attorney, Agent, or Firm* — Fujitsu Patent Center

(57) ABSTRACT

A storage unit stores the programs of software. An operation unit monitors processes generated by an installer for the software when the software is installed. The operation unit generates, based on file information about files accessed by the generated processes and the relationships between the processes, software configuration information associating the file information about the files with the software.

6 Claims, 20 Drawing Sheets

| INSTALLATION PROCESS MANAGEMENT TABLE ||||||| 131 |
|---|---|---|---|---|---|---|
| PARENT PROCESS ID | CHILD PROCESS ID |||| FILE INFORMATION STORAGE LOCATION | REGISTRY INFORMATION STORAGE LOCATION |
| 1234 | 1235 | 1236 | 1300 | — | file0000.txt | reg0000.txt |
| 5678 | 5679 | 5700 | 5701 | 5705 | file0001.txt | reg0001.txt |
| ... | ... | ... | ... | ... | ... | ... |

FIG. 6

| COMPONENT CONFIGURATION MANAGEMENT TABLE | | | | |
| --- | --- | --- | --- | --- |
| PROCESS ID | NAME OF FIRST UPDATED FILE OR REGISTRY | NAME OF LAST UPDATED FILE OR REGISTRY | UPDATE TIME (FIRST) | UPDATE TIME (LAST) |
| 1234 | aaa | bbb | 12:21:19:00 | 12:30:00:00 |
| 1235 | ccc | ddd | 12:30:30:00 | 12:35:10:00 |
| 1236 | eee | fff | 12:35:20:01 | 12:55:00:00 |
| ... | ... | ... | ... | ... |

FIG. 7

| CHECK START TIME MANAGEMENT TABLE | | |
|---|---|---|
| STARTUP ORDER | STARTUP TIME | PROCESS ID |
| 1 | 12:21:19:00 | 1234 |
| 2 | 12:23:18:99 | 1235 |
| 3 | 13:00:01:01 | 5678 |
| ... | ... | ... |

FIG. 8

| SOFTWARE DICTIONARY TABLE | | | | 134 |
|---|---|---|---|---|
| SOFTWARE NAME | CORRESPONDING SUITE PRODUCT | FILE INFORMATION STORAGE LOCATION | REGISTRY INFORMATION STORAGE LOCATION | |
| X | — | file0000X.txt | reg0000X.txt | |
| A | X | file0000A.txt | reg0000A.txt | |
| B | X | file0000B.txt | reg0000B.txt | |
| C | X | file0000C.txt | reg0000C.txt | |

FIG. 9

| COMPONENT CONFIGURATION MANAGEMENT DICTIONARY TABLE | | | | |
|---|---|---|---|---|
| SOFTWARE NAME | CORRESPOND- ING SUITE PRODUCT | NAME OF FIRST UPDATED FILE OR REGISTRY | NAME OF LAST UPDATED FILE OR REGISTRY | COMPONENT INSTALLATION ORDER |
| X | — | aaa | bbb | — |
| A | X | ccc | ddd | 1 |
| B | X | eee | fff | 2 |
| C | X | ggg | hhh | 3 |

BEFORE BUGS IN SOFTWARE A ARE FIXED

| SOFTWARE X | SOFTWARE INFORMATION (INCLUDING INFORMATION ABOUT SOFTWARE A, B, C) |

≠

AFTER BUGS IN SOFTWARE A ARE FIXED

| SOFTWARE X' | SOFTWARE INFORMATION (INCLUDING INFORMATION ABOUT SOFTWARE A', B, C) |

FIG. 19B

BEFORE BUGS IN SOFTWARE A ARE FIXED

| SOFTWARE X | SOFTWARE INFORMATION ABOUT SOFTWARE X |
| SOFTWARE A | SOFTWARE INFORMATION ABOUT SOFTWARE A |
| SOFTWARE B | SOFTWARE INFORMATION ABOUT SOFTWARE B |
| SOFTWARE C | SOFTWARE INFORMATION ABOUT SOFTWARE C |

=
≠
=
=

AFTER BUGS IN SOFTWARE A ARE FIXED

| SOFTWARE X | SOFTWARE INFORMATION ABOUT SOFTWARE X |
| SOFTWARE A' | SOFTWARE INFORMATION ABOUT SOFTWARE A' |
| SOFTWARE B | SOFTWARE INFORMATION ABOUT SOFTWARE B |
| SOFTWARE C | SOFTWARE INFORMATION ABOUT SOFTWARE C |

APPARATUS AND METHOD FOR SOFTWARE INFORMATION MANAGEMENT

CROSS-REFERENCE TO RELATED APPLICATION

This application is based upon and claims the benefit of priority of the prior Japanese Patent Application No. 2014-123206, filed on Jun. 16, 2014, the entire contents of which are incorporated herein by reference.

FIELD

The embodiments discussed herein relate to an apparatus and method for software information management.

BACKGROUND

In a system including a plurality of computers, software installed on each computer may be managed. For example, one of techniques for license management is to collect inventory information using a software dictionary and identify software existing in managed computers according to what files and what registry entries are in the managed computers. There is also a technique for monitoring changes made to files and registry during installation.

Please see, for example, Japanese Laid-open Patent Publications Nos. 2001-222424, 2011-197849, 2004-502236, and 2007-334821.

In a cloud or other environment with an increasing number of managed computers, it is demanded to confirm the identity of software installed on each computer.

However, differences in terms of much smaller units than administrators' manageable units (for example, products) are detected through the collection of inventory information or differential management of registry information.

Even if differences in files and registry entries between computers are detected through the collection of inventory information or the like and thereby an identity is not confirmed, administrators may not determine what countermeasures to take (reverse resolution) because the individual files and registry entries are not associated with the administrators' manageable units.

Further, a software dictionary does not contain sufficient associations between each of all products and individual files.

There is a technique for monitoring processes to identify the owners or the like of files added during installation. This technique, however, merely identifies the attributes of the individual files, as in the above techniques.

SUMMARY

According to one aspect, there is provided a non-transitory computer-readable storage medium storing a software information management program that causes a computer to execute a procedure including: monitoring a plurality of processes generated by an installer for software when the software is installed to the computer; and generating software configuration information based on a plurality of file information, the plurality of file information being about a plurality of files, respectively, that are accessed by the plurality of processes, and relationships between the plurality of processes, the software configuration information associating the plurality of file information with the software.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of an installation process management table;
FIG. 7 illustrates an example of a component configuration management table;
FIG. 8 illustrates an example of a check start time management table;
FIG. 9 illustrates an example of a software dictionary table;
FIG. 10 illustrates an example of a component configuration management dictionary table;
FIGS. 19A and 19B illustrate examples of checking the identity of software.

DESCRIPTION OF EMBODIMENTS

Figure 1:
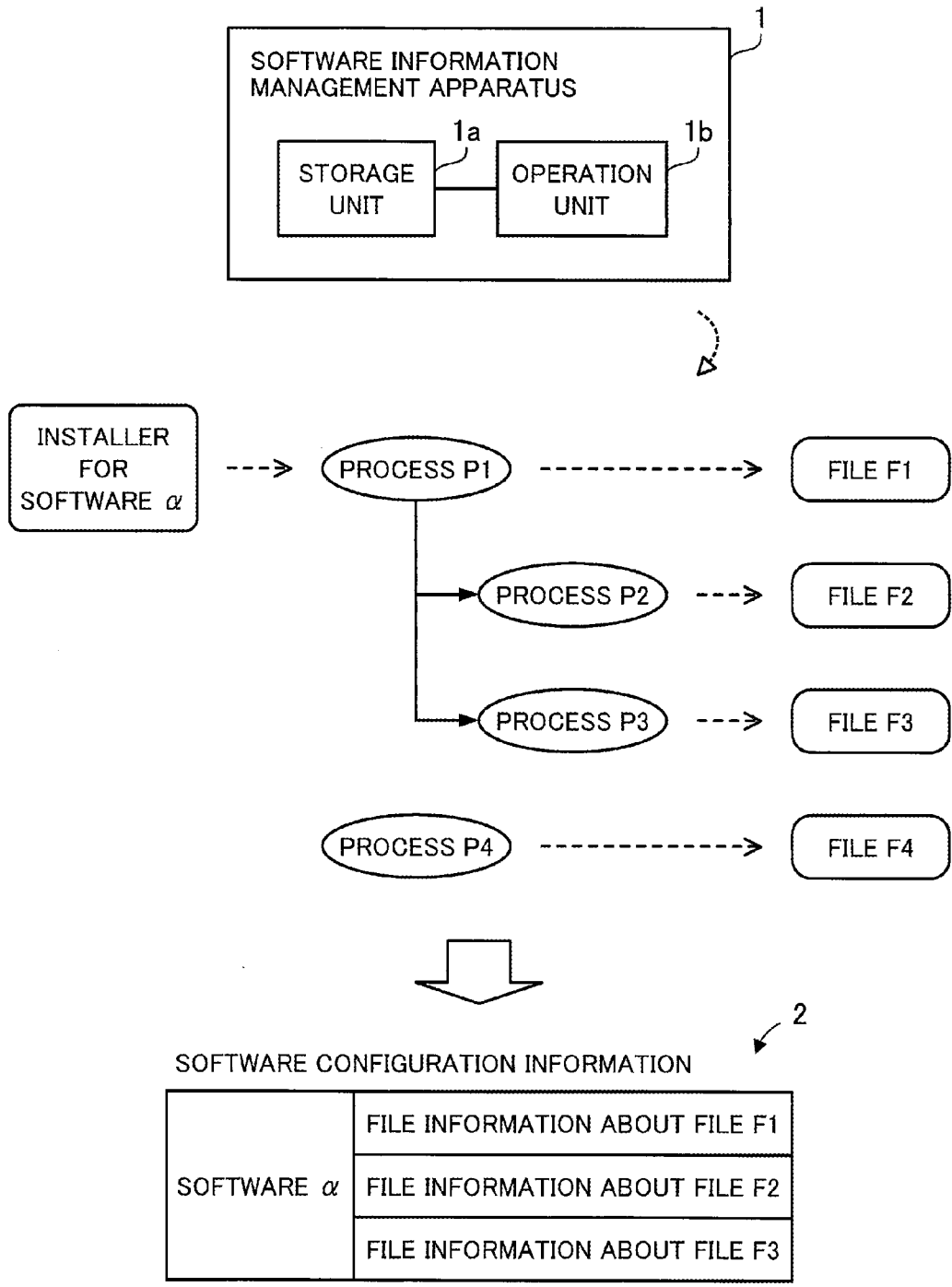
FIG. 1 illustrates a software information management apparatus according to a first embodiment.

Several embodiments will be described below with reference to the accompanying drawings, wherein like reference numerals refer to like elements throughout.

First Embodiment

FIG. 1 illustrates a software information management apparatus according to a first embodiment. The software information management apparatus 1 generates and manages software configuration information about software installed on the software information management apparatus 1. The software configuration information associates the identification information of the software and software-related information (data that the programs of the software use at runtime, data to be used while the software runs, or others). Such information may be called inventory information. The software information management apparatus 1 may manage software configuration information about software installed on apparatuses other than the software information management apparatus 1.

The software information management apparatus 1 includes a storage unit 1a and an operation unit 1b. The storage unit 1a may be a volatile storage device, such as a Random Access Memory (RAM), or a non-volatile storage device, such as a Hard Disk Drive (HDD) or a flash memory. The operation unit 1b may include a Central Processing Unit (CPU), a Digital Signal Processor (DSP), an Application Specific Integrated Circuit (ASIC), a Field Programmable Gate Array (FPGA), or the like. The operation unit 1b may be a processor that runs programs. The "processor" here may be a plurality of processors (multiprocessor).

The storage unit 1a stores the programs of software α. The programs of the software α include an installer program. The installer program is run to install the software α on the software information management apparatus 1. For example, the operation unit 1b runs the installer program to thereby implement the functions of the installer on the software information management apparatus 1. The installer places data to be used while the software α runs, in an HDD or another storage device provided in the software information management apparatus 1.

While installing software, the operation unit 1b monitors a plurality of processes generated by the installer for the software. A process is a unit of execution in a program that is executed by the Operating System (OS) running on the software information management apparatus 1. When the OS running on the software information management apparatus 1 executes a program of certain software, the OS generates a process to execute the program. The process includes information about various resources allocated for executing the program.

For example, to execute the installer program of the software α on the software information management apparatus 1, the OS of the software information management apparatus 1 generates a process P1 to execute the installer program of the software α. The software α may call another program. This means that another process may be generated by the process P1 (the installer for the software α).

For example, in the case where the software α includes another software as its component, the installer for the software α calls the installer program of the other software. Then, to execute the called program, the OS generates another process. For example, the OS generates a process P2 for a program called by the installer for the software α, and generates a process P3 for yet another program called by the installer for the software α. In this case, the process P1 is a parent process of the processes P2 and P3, and the processes P2 and P3 are the child processes of the process P1. Such parent-child relationships may be managed by the OS.

The operation unit 1b generates, based on a plurality of file information about a plurality of files that are accessed by a plurality of generated processes and the relationships between the plurality of processes, software configuration information associating the plurality of file information with software.

For example, the process P1 involves access to a file F1. The process P2 involves access to a file F2, and the process P3 involves access to a file F3. The files F1, F2, and F3 contain program executable code, data that the programs use at runtime, or others. The file information is the identification information of the files F1, F2, and F3, for example. The file information about each file F1, F2, F3 may include its path, update date and time, and size in the software information management apparatus 1.

For example, the operation unit 1b detects the parent-child relationship between the processes P1 and P2 and the parent-child relationship between the processes P1 and P3. As described earlier, the operation unit 1b obtains each parent-child relationship between processes from the OS. The operation unit 1b generates software configuration information 2 associating the file information about the files F1, F2, and F3 with the software α on the basis of the parent-child relationships between the processes P1 and P2 and between the processes P1 and P3. That is to say, not only the file information about the file F1 accessed by the process P1 but also the file information about the file F2 accessed by the process P2, which is a child process of the process P1, is associated with the software α. Similarly, the file information about the file F3 accessed by the process P3, which is a child process of the process P1, is associated with the software α.

As described above, when installing the software α, the above-described software information management apparatus 1 monitors the processes P1, P2, and P3 generated by the installer for the software α, and then generates, based on the plurality of file information about the files F1, F2, and F3 respectively accessed by the processes P1, P2, and P3 and the relationships between the processes P1, P2, and P3, the software configuration information 2 associating the file information about the files F1, F2, and F3 with the software α. This approach enables managing the files and settings of a managed computer in association with software.

In a cloud or other environment with an increasing number of managed computers, it is demanded to confirm the identity of software installed on each computer, in order to achieve the stable operation of the system and efficient maintenance work. However, differences in terms of much smaller units than administrators' manageable units (for example, products) are obtained through the collection of inventory information or the like.

Assume that individual files and registry entries are not associated with administrator's manageable units. In this case, it is difficult to determine what countermeasures to take (reverse resolution) even if differences in files among computers are detected through the collection of inventory information or the like and thereby an identity is not confirmed.

In addition, a software dictionary prepared in advance may not contain sufficient associations between each of all software products and individual files. For example, consider the case where the software α is a suite product, which includes other software as components. In this case, a simple association of file information with the respective software is insufficient and it is not easy to recognize the files of the software that are involved in the processing of the software α.

To deal with these, the software information management apparatus 1 associates the file information about files accessed by the processes generated at the time of installing the software α, with the software α on the basis of the relationships between the processes.

When the software α is installed, files related to the operation for the software α are collectively generated or changed in the software information management apparatus 1. That is, it is possible to associate the files F1, F2, and F3 accessed by the installer process P1 and the processes P2 and P3 having relationships with the installer process P1 with the software α.

Especially, in the case where the software α includes another software as its component, the other software is installed by the installer for the software α when the software α is installed. In this case, the installer process P1 of the software α starts an installer for the other software, thereby generating a process (for example, processes P2 and P3) to execute the installer for the other software.

In this case, the processes P2 and P3 are managed as the child processes of the process P1. By associating the files F2 and F3 accessed by the child processes P2 and P3 of the process P1 with the software α, it becomes possible to associate the files related to the other software, which is the components of the software α, with the software α.

By the way, the software information management apparatus 1 has many processes that are not related to installers. The software information management apparatus 1 determines files that are not related to the software α on the basis of the relationships among processes. For example, the software information management apparatus 1 does not associate file information about a file F4 accessed by a process P4 having no parent-child relationship with the process P1 with the software α. This prevents unneeded file information from being associated with the software α. As a result, the software information management apparatus 1 is able to appropriately associate the files F1, F2, and F3 with the software α.

Further, even if an existing software dictionary does not contain information about the software α, the software information management apparatus 1 is able to obtain file information related to the software α. Therefore, it is possible to extend the software dictionary easily. Software configuration information for other apparatuses may be generated in the same manner.

The software information management apparatus 1 is able to confirm with reference to a generated software dictionary whether the software installed on another computer is the same as the software registered in the software dictionary. Especially, it becomes possible to confirm the identity of software in terms of software groups, such as suite products. For example, it is possible to confirm whether a plurality of software products was installed on another computer, all together as a suite product or individually.

The above example is the case where the software α is installed on the software information management apparatus 1. Another case may be considered. For example, the operation unit 1b employs the above-described procedure of this first embodiment when the software α is installed on a virtual machine running on the software information management apparatus 1. In this case, it is considered to confirm the identity of installed software among a plurality of virtual machines running on the software information management apparatus 1.

Second Embodiment

Figure 2:
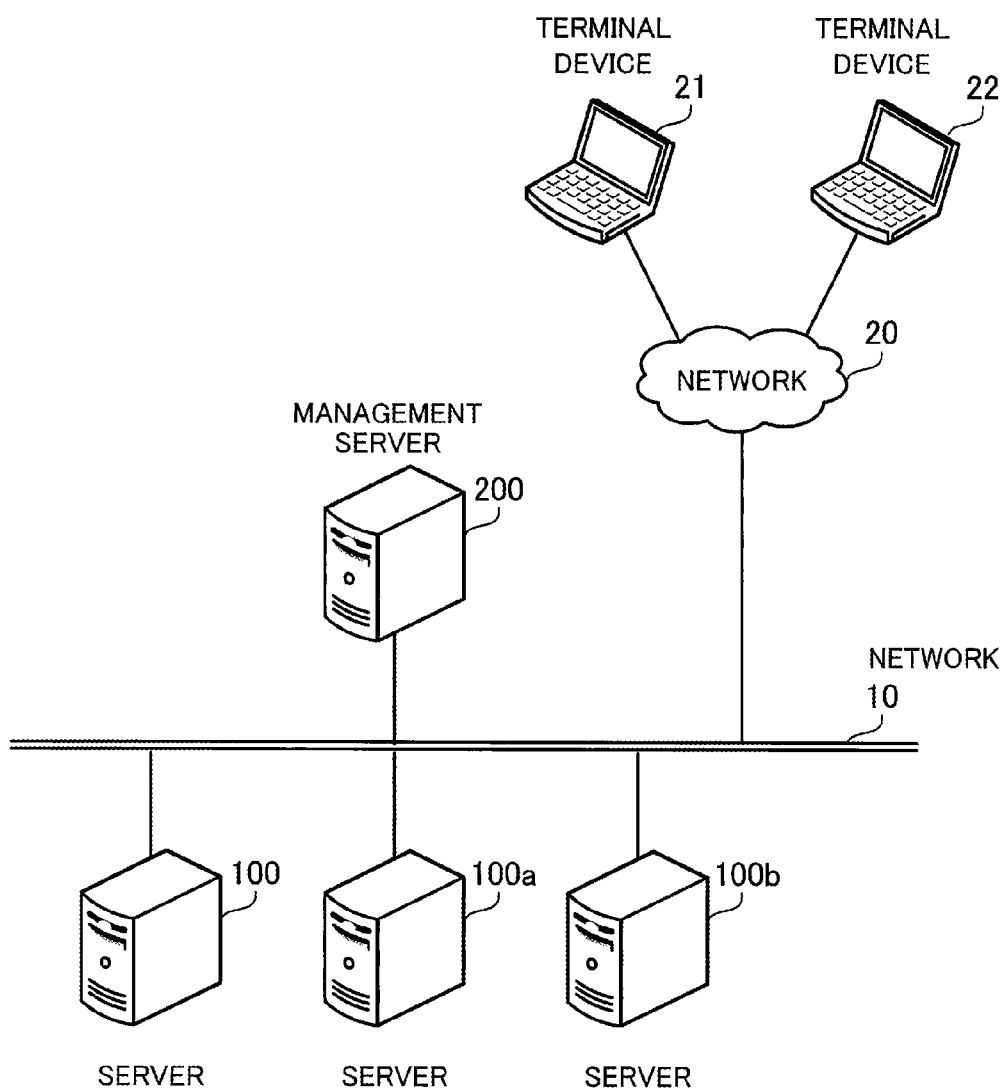
FIG. 2 illustrates an information processing system according to a second embodiment.

FIG. 2 illustrates an information processing system according to a second embodiment. The information processing system of the second embodiment includes servers 100, 100a, and 100b, a management server 200, and terminal devices 21 and 22. The servers 100, 100a, 100b and the management server 200 are connected to a network 10. The network 10 is a Local Area Network (LAN), for example, and is connected to a network 20. The network 20 is a Wide Area Network (WAN), the Internet, or the like, for example.

The servers 100, 100a, and 100b are server computers that provide prescribed services for the terminal devices 21 and 22. For example, a variety of software is installed on the servers 100, 100a, and 100b. The servers 100, 100a, and 100b are considered as one example of the software information management apparatus 1 of the first embodiment.

The management server 200 is a server computer that collectively manages software information about the software installed on the servers 100, 100a, and 100b. The management server 200 also manages the identity of software installed on the servers 100, 100a, and 100b.

The terminal devices 21 and 22 are client computers that access the servers 100, 100a, and 100b over the networks 10 and 20. The users of the terminal devices 21 and 22 are able to use the software installed on the servers 100, 100a, and 100b over the networks 10 and 20.

Figure 3:
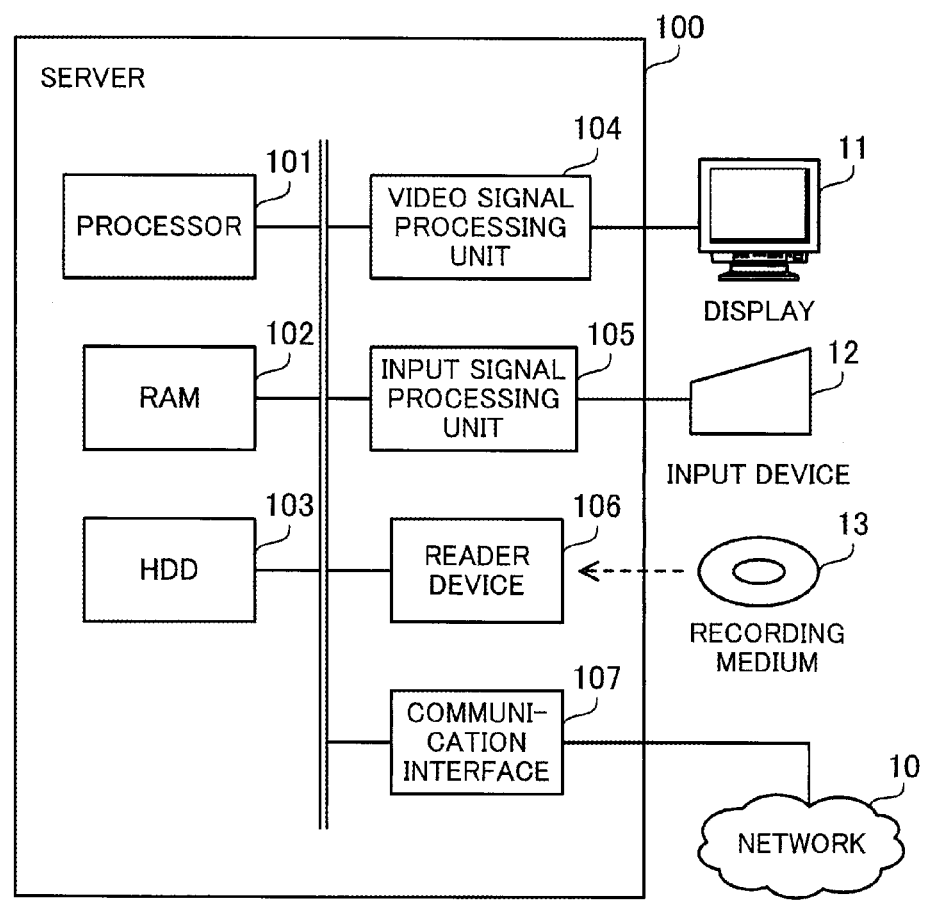
FIG. 3 illustrates exemplary hardware of a server.

FIG. 3 illustrates exemplary hardware of a server. The server 100 includes a processor 101, a RAM 102, an HDD 103, a video signal processing unit 104, an input signal processing unit 105, a reader device 106, and a communication interface 107. Each of these units is connected to a bus in the server 100. The servers 100a and 100b and the management server 200 may be configured with the same hardware as the server 100.

The processor 101 controls the information processing performed by the server 100. The processor 101 may be a multiprocessor. The processor 101 may be, for example, a CPU, a DSP, an ASIC, an FPGA, or the like. The processor 101 may be a combination of two or more selected from a CPU, a DSP, an ASIC, an FPGA, and the like.

The RAM 102 is a primary storage device of the server 100. The RAM 102 temporarily stores at least part of Operating System (OS) programs and application programs to be executed by the processor 101. The RAM 102 also stores various data that the processor 101 uses in processing.

The HDD 103 is a secondary storage device of the server 100. The HDD 103 writes and reads data magnetically on a built-in magnetic disk. The HDD 103 stores OS programs, application programs, and various data. The server 100 may be provided with another kind of secondary storage device, such as a flash memory or a Solid State Drive (SSD), or with a plurality of secondary storage devices.

The video signal processing unit 104 outputs images to a display 11 connected to the server 100 in accordance with instructions from the processor 101. As the display 11, a Cathode Ray Tube (CRT) display, a crystal liquid display, or another may be used.

The input signal processing unit 105 transfers input signals received from an input device 12 connected to the server 100, to the processor 101. As the input device 12, a pointing device, such as a mouse or a touch panel, a keyboard, or the like may be used.

The reader device 106 reads programs or data from a recording medium 13. As the recording medium 13, for example, a magnetic disk, such as a Flexible Disk (FD) or an HDD, an optical disc, such as a Compact Disc (CD) or a Digital Versatile Disc (DVD), or a Magneto-Optical disk (MO) may be used. As the recording medium 13, for example, a non-volatile semiconductor memory, such as a flash memory card, may be used. The reader device 106 stores programs and data read from the recording medium 13 in the RAM 102 or HDD 103 in accordance with, for example, instructions from the processor 101.

The communication interface 107 performs communication with other apparatuses over the network 10. The communication interface 107 may be a wired communication interface or a wireless communication interface.

Figure 4:
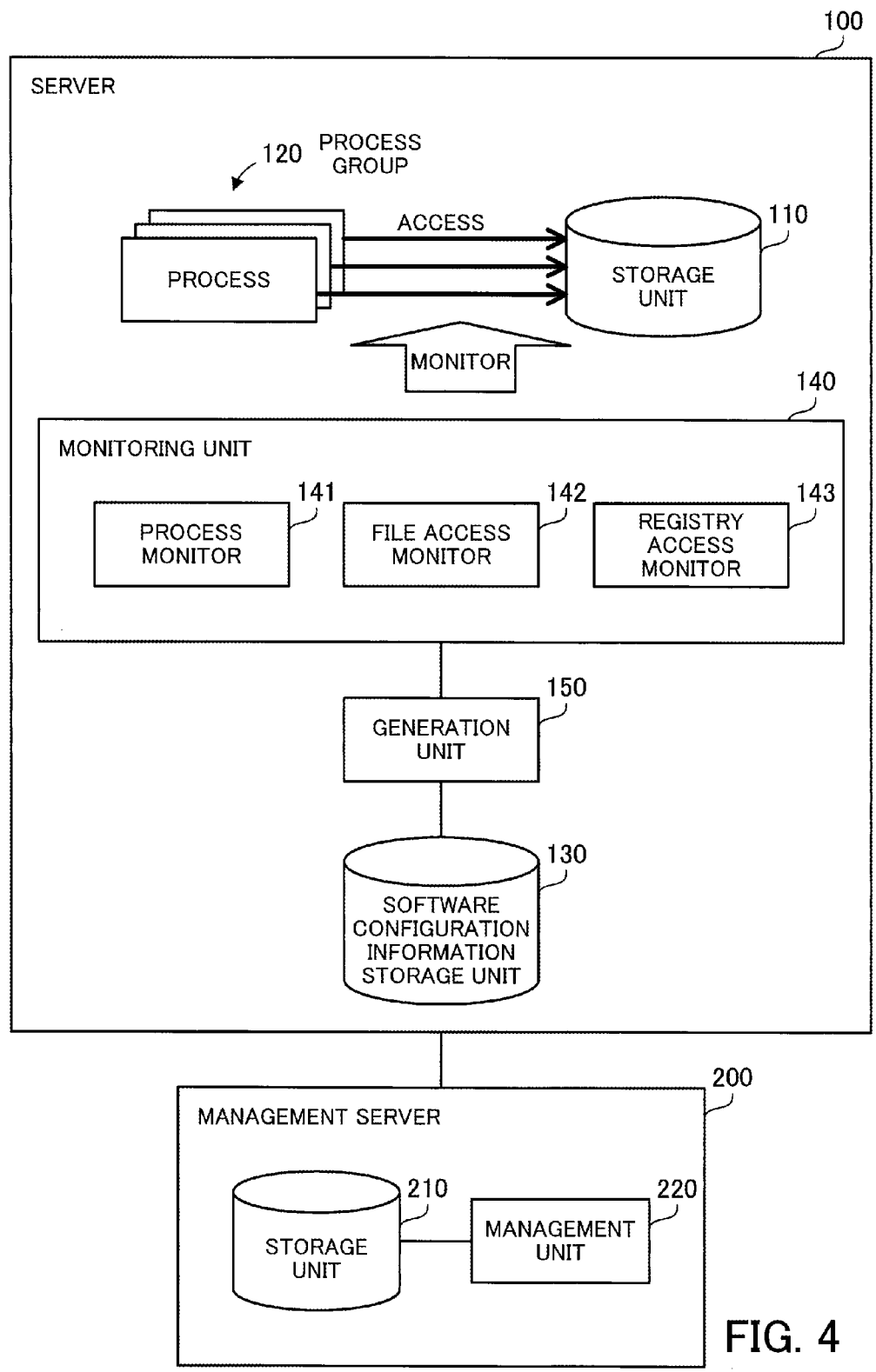
FIG. 4 illustrates exemplary functions of the server and a management server.

FIG. 4 illustrates exemplary functions of a server and a management server. The server 100 includes a storage unit 110, a process group 120, a software configuration information storage unit 130, a monitoring unit 140, and a generation unit 150. The storage unit 110 and software configuration information storage unit 130 may be implemented as part of storage space of the RAM 102 or HDD 103. The monitoring unit 140 and generation unit 150 may be implemented as program modules to be executed by the processor 101. In this connection, the servers 100a and 100b may have the same functions as the server 100.

The storage unit 110 stores various files (including the programs of software and the setting data for OS such as registry).

The process group 120 is made up of a plurality of processes generated by the OS to execute various programs. For example, the OS generates a process to execute a program. The program is executed with the process.

For example, the OS generates a process when a prescribed program starts along with the startup of the OS, when execution of a program is instructed by a user, when a process calls another program, or when another event occurs. To execute a program, a process accesses a corresponding file (for example, executable code). In addition, a process may access a file describing various settings that the program uses at run-time.

The software configuration information storage unit 130 stores software configuration information. The software configuration information associates the identification information of software with software-related information (the programs of the software, data to be used while the software runs, or others). Such information may be called inventory information.

The monitoring unit 140 monitors the generation status of processes, the relationships between the processes, and the access status of the processes to the storage unit 110, and outputs the monitoring results to the generation unit 150. The monitoring unit 140 includes a process monitor 141, a file access monitor 142, and a registry access monitor 143.

The process monitor 141 monitors the generation status of processes and the relationships between the processes. The process monitor 141 obtains information about when processes were generated and the relationships between the processes from the OS and gives the information to the generation unit 150.

The file access monitor 142 monitors access by processes to files. The file access monitor 142 detects access by processes to files and gives information about the processes having made the access, the files having been accessed, and so on to the generation unit 150.

The registry access monitor 143 monitors access by processes to the registry. The registry access monitor 143 detects access by processes to registry entries and gives information about the processes having made the access, the registry entries having been accessed, and so on to the generation unit 150.

The generation unit 150 generates software configuration information on the basis of the monitoring results received from the monitoring unit 140, and stores the software configuration information in the software configuration information storage unit 130. The obtained monitoring results include the above-described information given from the process monitor 141, file access monitor 142, and registry access monitor 143.

More specifically, when software is installed, the generation unit 150 obtains information about an installer process for the software and information about processes related to the installer process. In addition, the generation unit 150 obtains information about files accessed by the recognized processes. The generation unit 150 associates the installed software and the information about files and registry entries related to the installed software with each other on the basis of the obtained information to thereby generate software configuration information. The generation unit 150 then sends the generated software configuration information to the management server 200.

In the above example, the functions of the server 100 have been described. The servers 100a and 100b have the same functions as the server 100.

The management server 200 includes a storage unit 210 and a management unit 220. The storage unit 210 is implemented as part of storage space of the RAM or HDD of the management server 200. The management unit 220 may be implemented as a program module to be executed by the processor of the management server 200.

The storage unit 210 stores software configuration information received from the servers 100, 100a, and 100b. The storage unit 210 stores software configuration information about a plurality of software.

The management unit 220 checks the identity of software installed on the servers 100, 100a, and 100b on the basis of the information stored in the storage unit 210. The management unit 220 also manages the software installed on the servers 100, 100a, and 100b.

Figure 5:
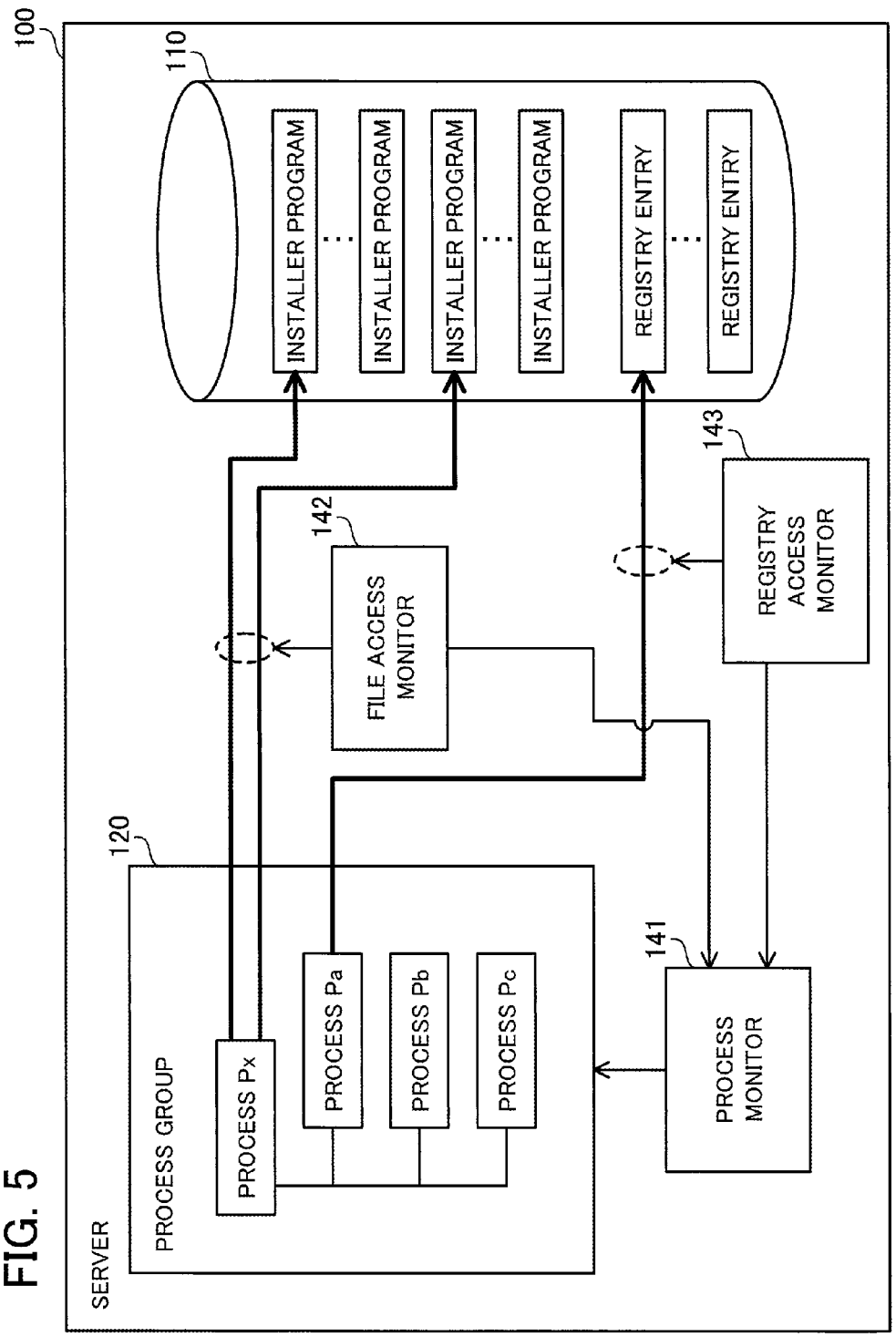
FIG. 5 illustrates an example of how to monitor processes.

FIG. 5 illustrates an example of how to monitor processes. A process group 120 includes processes Px, Pa, Pb, and Pc. The process Px is to execute the installer program of software X. The software X is a suite product that includes software A, B, and C.

The process Pa is to execute the installer program of the software A. The process Pb is to execute the installer program of the software B. The process Pc is to execute the installer program of the software C.

The process Px is the parent process of the processes Pa, Pb, and Pc. In other words, the processes Pa, Pb, and Pc are the child processes of the process Px.

The process monitor 141 monitors generation, deletion, and so on of the processes Px, Pa, Pb, and Pc. The process monitor 141 may inquire about the parent-child relationships between the processes Px, Pa, Pb, and Pc to the OS.

The file access monitor 142 monitors access by the processes Px, Pa, Pb, and Pc to files (file access). The files accessed by the processes Px, Pa, Pb, and Pc include the files of installer programs, files to be installed (installation files), and others.

The registry access monitor 143 monitors access by the processes Px, Pa, Pb, and Pc to registry entries (registry access).

FIG. 6 illustrates an example of an installation process management table. An installation process management table 131 is stored in the software configuration information storage unit 130. The installation process management table 131 includes fields for "parent process Identifier (ID)," "child process ID," "file information storage location," and "registry information storage location."

The "parent process ID" field contains the identification information of a parent process. The "child process ID" field contains the identification information of the child processes of the parent process. The "file information storage location" field indicates file information about files accessed by the parent and child processes. The file information includes information (file name, path, update date and time, and others) about files accessed by each process in association with the identification information of the process. The "registry information storage location" field indicates registry information (name (registry name) identifying registry settings, path, update date and time, and others) about registry entries accessed by the parent and child processes. The registry information includes information about registry entries accessed by each process in association with the identification information of the process.

For example, the installation process management table 131 has a record with "1234" in the "parent process ID" field, "1235," "1236," and "1300" in the "child process ID" field, "file0000.txt" in the "file information storage location" field, and "reg0000.txt" in the "registry information storage location" field.

This record indicates that the child processes with process IDs "1235," "1236," and "1300" have been generated for the process with process ID "1234" and that the file information about files accessed by these processes is "file0000.txt." The file information "file0000.txt" describes the file name, path, creation date and time, and others of each file accessed by each of the processes with process IDs "1235," "1236," and "1300" in association with the corresponding process ID.

In addition, the record indicates that the registry information about registry entries accessed by these processes is "reg0000.txt." The registry information "reg0000.txt" describes the registry name, path, creation date and time, and others of each registry entry accessed by each of the processes with process IDs "1235," "1236," and "1300" in association with the corresponding process ID. The hyphen "-" in the "child process ID" field indicates no entry.

FIG. 7 illustrates an example of a component configuration management table. The component configuration management table 132 is stored in the software configuration information storage unit 130. The component configuration management table 132 includes fields for "process ID," "name of first updated file or registry," "name of last updated file or registry," "update time (first)," and "update time (last)."

The "process ID" field contains the identification information of a process. The "name of first updated file or registry" field contains the name (identification information) of a file or registry entry updated first by the process. The "name of last updated file or registry" field contains the name (identification information) of a file or registry entry updated last by the process. The "update" here means generation of a new file or registry settings or change of an existing file or registry settings. The "update time (first)" field indicates the update time of the first updated file or registry entry. The "update time (last)" field indicates the update time of the last updated file or registry entry.

For example, the component configuration management table 132 has a record with "1234" in the "process ID" field, "aaa" in the "name of first updated file or registry" field, "bbb" in the "name of last updated file or registry" field, "12:21:19:00" in the "update time (first)" field, and "12:30:00:00" in the "update time (last)" field.

This record indicates that the process with process ID "1234" updated the file or registry entry named "aaa" first at 12:21:19. The record also indicates that the process with process ID "1234" updated the file or registry entry named "bbb" last at 12:30:00.

FIG. 8 illustrates an example of a check start time management table. A check start time management table 133 is stored in the software configuration information storage unit 130. The check start time management table 133 includes fields for "startup order," "startup time," and "process ID."

The "startup order" field indicates the position of a process in the startup (generation) order of processes. Positions in the startup order are expressed by integers of one or greater. A smaller integer indicates an earlier startup time. The "startup time" field indicates when the process was started up. The "process ID" field contains the identification information of the process.

For example, the check start time management table 133 has a record with "1" in the "startup order" field, "12:21:19:00" in the "startup time" field, and "1234" in the "process ID" field. This record indicates that the process with process ID "1234" is the "1st" in the startup order and its startup time is 12:21:19.

The process monitor 141 determines the earliest one of the startup times registered in the check start time management table 133 as a check start time.

FIG. 9 illustrates an example of a software dictionary table. A software dictionary table 134 is stored in the software configuration information storage unit 130. The software dictionary table 134 includes fields for "software name," "corresponding suite product," "file information storage location," and "registry information storage location."

The "software name" field indicates the name of software. The "corresponding suite product" field indicates the name of a suite product (software) to which the software belongs. The "file information storage location" field contains information (file information) about files related to the software. The "registry information storage location" field contains information (registry information) about registry entries related to the software.

For example, the software dictionary table 134 has a record with "X" in the "software name" field, no entry "-" (hyphen) in the "corresponding suite product" field, "file0000X.txt" in the "file information storage location" field, and "reg0000X.txt" in the "registry information storage location" field. This record indicates that "file0000X.txt" is obtained as file information related to the software X and that "reg0000X.txt" is obtained as registry information related to the software X. Since the software X itself is a suite product, no value is entered in the "corresponding suite product" field.

In addition, the software dictionary table 134 has a record with "A" in the "software name" field, "X" in the "corresponding suite product" field, "file0000A.txt" in the "file information storage location" field, and "reg0000A.txt" in the "registry information storage location" field. This record indicates that "file0000A.txt" is obtained as file information related to the software A and that "reg0000A.txt" is obtained as registry information related to the software A. The record also indicates that the software X is a suite product to which the software A belongs, that is, the software A is a software component of the software X.

Referring to the example of the software dictionary table 134, the software X is registered as a corresponding suite product in the records with respect to the software A, B, and C. Therefore, it is confirmed from the software dictionary table 134 that the software A, B, and C is the software components of the software X.

FIG. 10 illustrates an example of a component configuration management dictionary table. A component configuration management dictionary table 135 is stored in the software component information storage unit 130. The component configuration management dictionary table 135 includes fields for "software name," "corresponding suite product," "name of first updated file or registry," "name of last updated file or registry," and "component installation order."

The "software name" field indicates the name of software. The "corresponding suite product" field indicates the name of a suite product to which the software belongs. The "name of first updated file or registry" and "name of last updated file or registry" fields have the same data as those of the component configuration management table 132. The "component installation order" field contains a value indicating when in the installation order the software component was installed in the illustration of the corresponding suite product. There is no entry "-" in the "component installation order" field with respect to the record for a suite product.

For example, the component configuration management dictionary table 135 has a record with "X" in the "software name" field, no entry "-" in the "corresponding suite product" field, "aaa" in the "name of first updated file or registry" field, "bbb" in the "name of last updated file or registry" field, and no entry "-" in the "component installation order" field. This record indicates that the software X updated the file or registry entry named "aaa" first and that the software X updated the file or registry entry named "bbb" last. Since the software X itself is a suite product, no value is entered in the "corresponding suite product" and "component installation order" fields.

In addition, the component configuration management dictionary table 135 has another record with "A" in the "software name" field, "X" in the "corresponding suite product" field, "ccc" in the "name of first updated file or registry" field, "ddd" in the "name of last updated file or registry" field, and "1" in the "component installation order" field. This record indicates that the software A is a component of the software X, which is a suite product, and was installed first as a component when the software X was installed. The record also indicates that the software A updated the file or registry entry named "ccc" first and that the software A updated the file or registry entry named "ddd" last.

Figure 11:
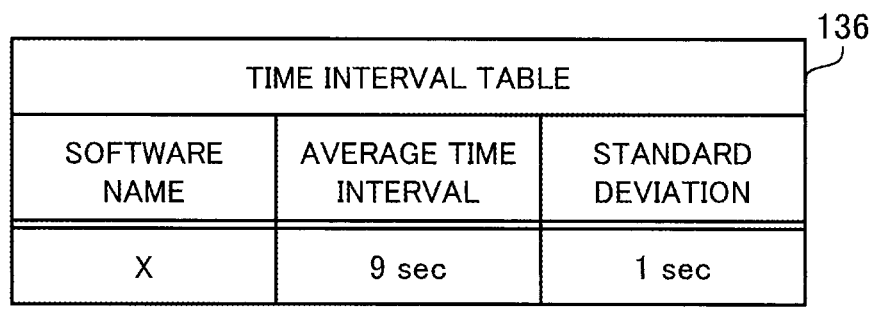
FIG. 11 illustrates an example of a time interval table.

FIG. 11 illustrates an example of a time interval table. A time interval table 136 contains information about time intervals for installing the software components of a software suite product. A time interval indicates a time period from completion of installation of a certain software component to start of installation of the next software component. The time interval table 136 is used for checking the identity of software. The time interval table 136 is stored in the software configuration information storage unit 130. The time interval table 136 includes fields for "software name," "average time interval," and "standard deviation."

The "software name" field indicates the software name of a suite product. The "average time interval" field indicates an average time interval for installing the software components. The "standard deviation" field indicates the standard deviation of measured average time intervals.

For example, the time interval table 136 has a record with "X" in the "software name" field, "9 sec" in the "average time interval" field, and "1 sec" in the "standard deviation" field. This record indicates that an average time interval for installing the software A, B, and C, which is the components of the software X, is 9 seconds, and the standard deviation of measured time intervals is 1 second. Such information about time intervals is obtained based on the update times of files and registry entries updated by the installers for the software A, B, and C.

Figure 12:
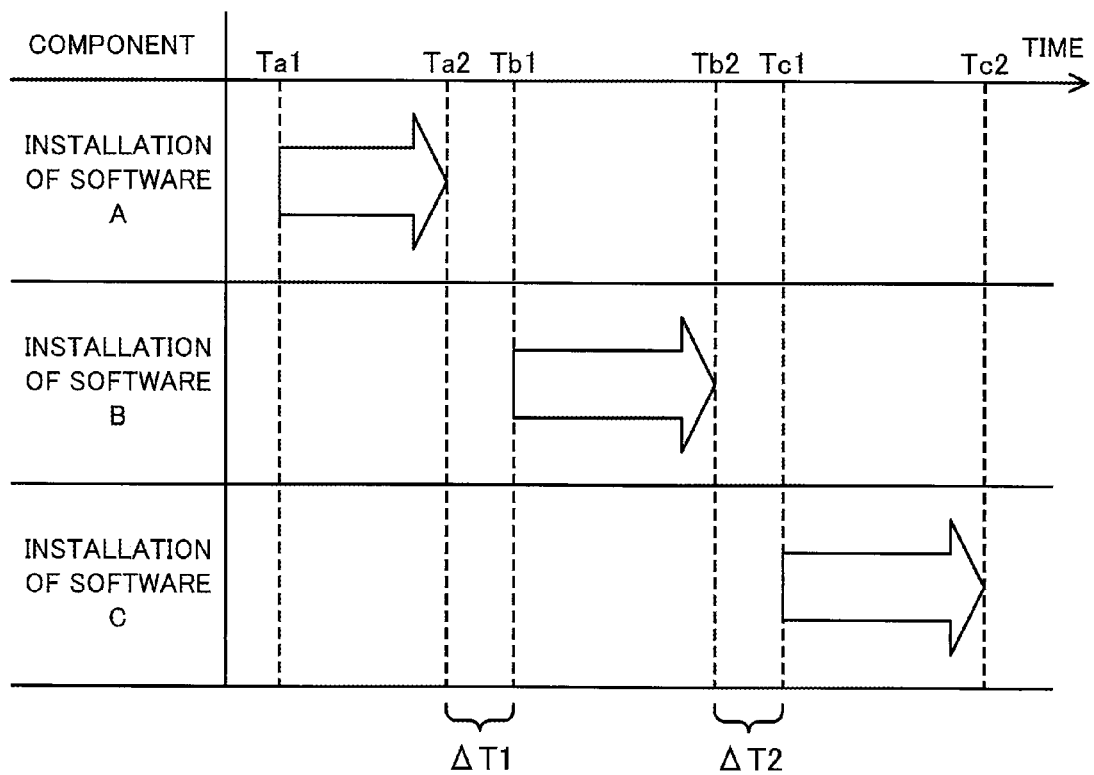
FIG. 12 illustrates an example of the time series of update times of files and registry.

FIG. 12 illustrates an example of the time series of update times of files and registry. The software A, B, and C, which is the components of the software X, is installed in series. This is because, if a plurality of software is installed in parallel, a plurality of installers may suffer from access contention for a common file or registry entry, which may cause installation failure or difficulty. In the case of the software X, its software components are installed in the order of software A, B, and C. The installation order is controlled by the installer for the software X, for example.

Time Ta1 is the first update time of files and registry entries by the installer for the software A. Time Ta2 is the last update time of files and registry entries by the installer for the software A. This means that the installer for the software A installed the software A during the period from time Ta1 to time Ta2.

Time Tb1 is the first update time of files and registry entries by the installer for the software B. Time Tb2 is the last update time of files and registry entries by the installer for the software B. This means that the installer for the software B installed the software B during the period from time Tb1 to time Tb2.

Time Tc1 is the first update time of files and registry entries by the installer for the software C. Time Tc2 is the last update time of files and registry entries by the installer for the software C. This means that the installer for the software C installed the software C during the period from time Tc1 to time Tc2.

The time interval $\Delta T1$ between times Ta2 and Tb1 corresponds to the time interval between the installation of the software A and the installation of the software B. The time interval $\Delta T2$ between times Tb2 and Tc1 corresponds to the time interval between the installation of the software B and the installation of the software C. The average of the time intervals $\Delta T1$ and $\Delta T2$ is taken as the average time interval. The variances and standard deviation of the time intervals $\Delta T1$ and $\Delta T2$ with respect to the average time interval may be obtained. The average time interval, standard deviation, and so on may be obtained in the same way in the case where there are four or more software components.

In addition, the installation order of the software A, B, and C may be determined based on the time series of the first and last update times of files and registry entries updated by the installers for the software A, B, and C. For example, time Ta1 is prior to times Tb1 and Tc1. This means that the software A was installed before the software B and C. Similarly, time Tb1 is prior to time Tc1. This means that the software B was installed before the software C. In this case, as the installation order of the software A, B, and C, which are the components of the software X, the software A is the first (first), the software B is next (second), and then the software C is the last (third).

Figure 13:
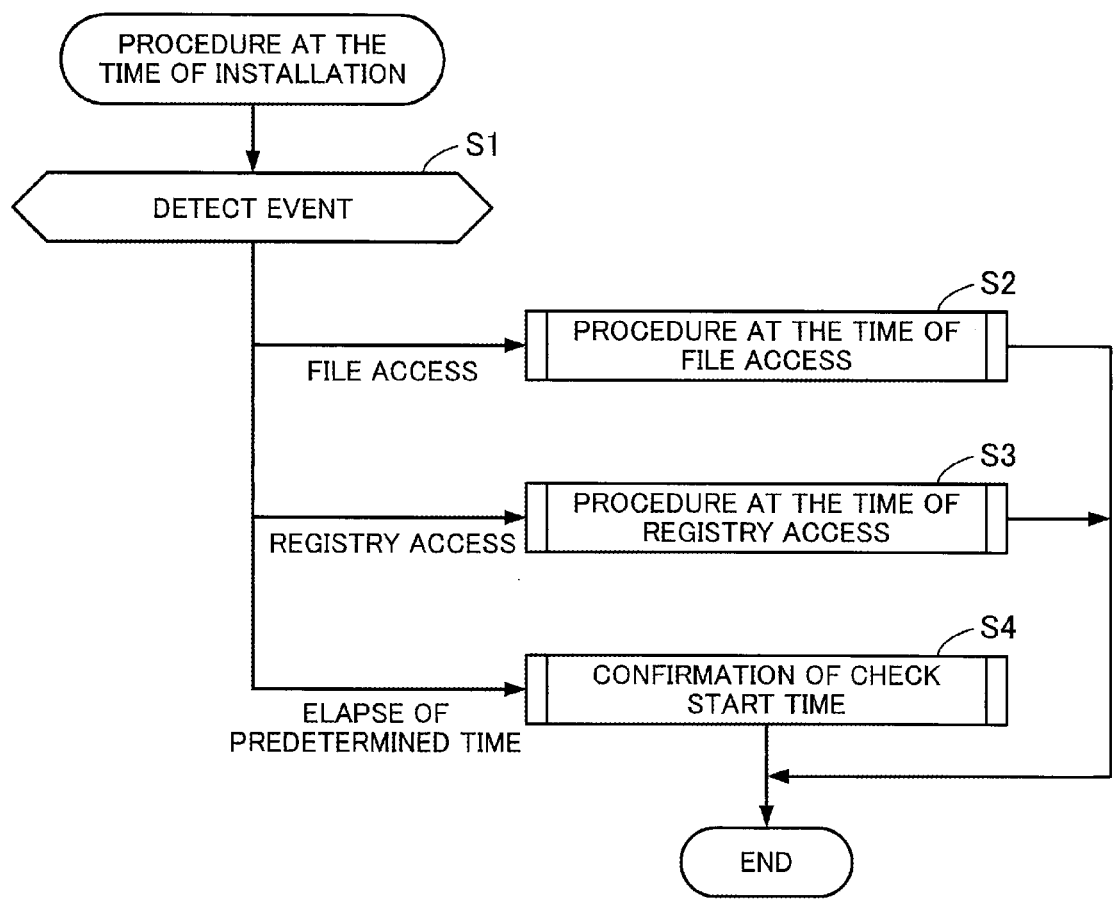
FIG. 13 is a flowchart of exemplary processing steps that are performed at the time of installation.

FIG. 13 is a flowchart of exemplary processing steps that are performed at the time of installation. The processing steps of FIG. 13 will be described step by step. In the following, it is assumed that the software X is installed by the server 100.

(S1) The monitoring unit 140 detects whether an event has occurred. Events include file access and registry access by any process, and an elapse of a predetermined time. When the monitoring unit 140 detects file access, the flowchart proceeds to step S2. When the monitoring unit 140 detects registry access, the flowchart proceeds to step S3. When the monitoring unit 140 detects an elapse of a predetermined time, the flowchart proceeds to step S4. The "elapse of a predetermined time" here is an elapse of a predetermined time from the start time of installation of the software X or a predetermined time from completion of the last execution of step S4. The "predetermined time" may be set to 30 seconds, 1 minute, or the like, for example.

(S2) The monitoring unit 140 performs a procedure that is performed when file access is made. More specifically, the monitoring unit 140 detects the type of an accessed file, an access time, and a process having made the file access, registers a parent-child relationship between processes, and so on. This step will be described in detail later.

(S3) The monitoring unit 140 performs a procedure that is performed when registry access is made. More specifically, the monitoring unit 140 detects an access time, and a process having made the registry access, registers a parent-child relationship between processes, and so on. This step will be described in detail later.

(S4) The monitoring unit 140 confirms the check start time. This confirmation is done to exclude processes that have apparently no connection with the installer for the software X. This step will be described in detail later.

As described above, when the software X starts to be installed, the monitoring unit 140 monitors file access and registry access made by each process, and executes the above procedure each time the monitoring unit 140 detects an event. For example, when starting to install the software X, the user is able to instruct the server 100 to start the above monitoring. The monitoring unit 140 keeps on the above monitoring until the installation of the software X is completed (that is, until the installer process Px for the software X is deleted by the OS).

Figure 14:
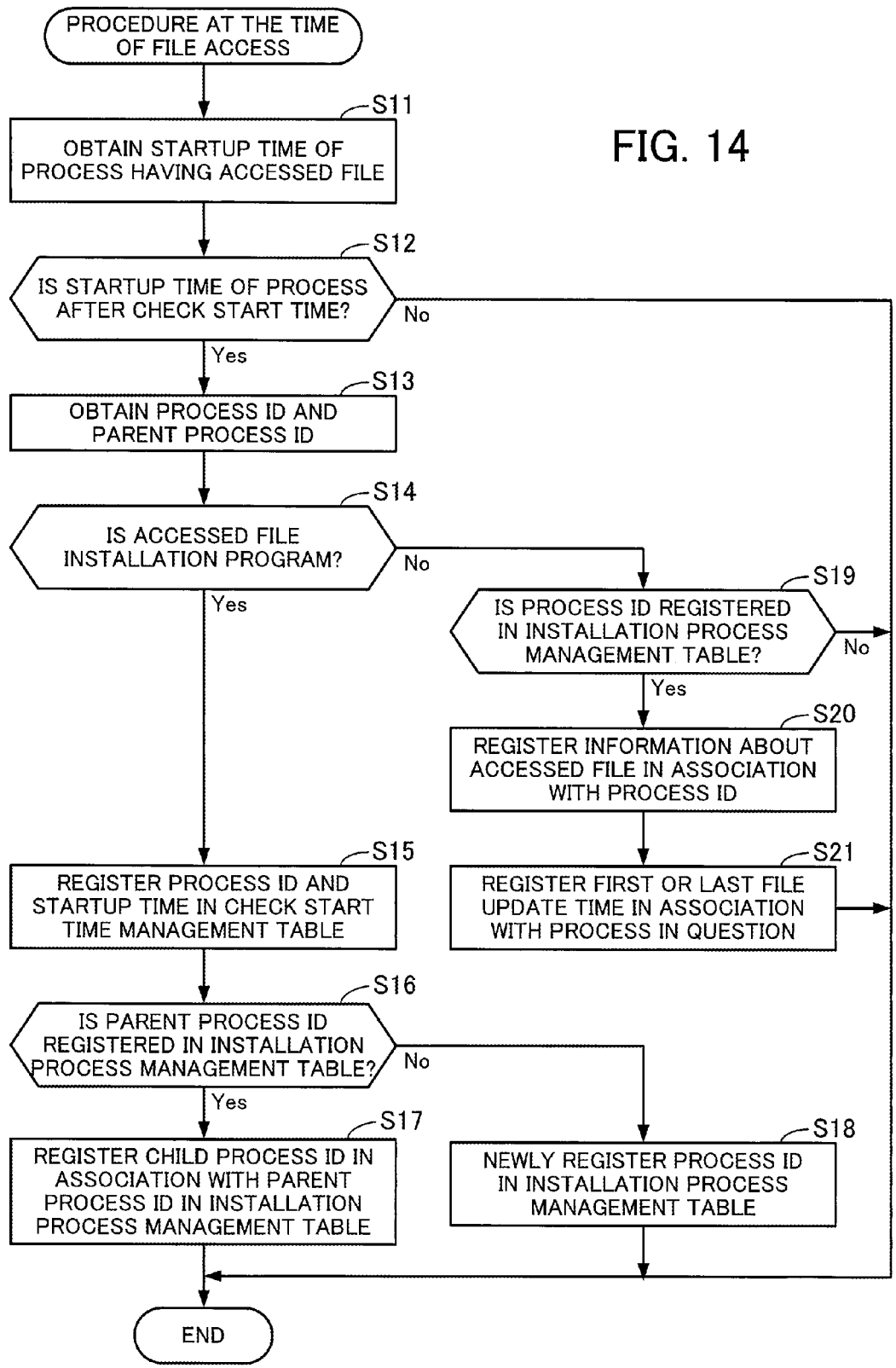
FIG. 14 is a flowchart of exemplary processing steps that are performed when file access is made.

FIG. 14 is a flowchart of exemplary processing steps that are performed when file access is made. The processing steps of FIG. 14 will be described step by step. The following procedure corresponds to step S2 of FIG. 13.

(S11) The file access monitor 142 notifies the process monitor 141 of the process ID of a process having accessed a file. The process monitor 141 obtains the startup time of the process corresponding to the obtained process ID from the OS.

(S12) The process monitor 141 determines with reference to the check start time management table 133 whether the startup time obtained at step S11 is after the earliest one (check start time) of the startup times registered in the check start time management table 133. If the obtained startup time is after the check start time, the flowchart proceeds to step S13. Otherwise, the flowchart is completed.

(S13) The process monitor 141 obtains the process ID (child process ID) of the process in question and the process ID (parent process ID) of the parent process of the process in question. The process monitor 141 is notified of the process ID of the process in question from the file access monitor 142 at step S11. The process monitor 141 obtains the parent process ID corresponding to the obtained process ID from the OS.

(S14) The file access monitor 142 determines whether the file accessed by the process in question is an installation program. If the file is an installation program, the flowchart proceeds to step S15. Otherwise, the flowchart proceeds to step S19. For example, the file access monitor 142 makes this determination on the basis of the file name of the accessed file or a command used for the access. More specifically, files whose names include a character string such as setup.exe, files in msi or rpm format (files with .msi or .rpm extension), files that are accessed based on a pkgadd command, or others are determined to be installation programs. In addition, tar files, zip files, gzip files, or other archive files may be determined to be installation programs.

(S15) The process monitor 141 registers the process ID (child process ID obtained at step S13) and the startup time (startup time obtained at step S11) of the process in question in the check start time management table 133.

(S16) The generation unit 150 collects the information obtained at steps S11 to S14 from the process monitor 141 and file access monitor 142. The generation unit 150 determines whether the parent process ID obtained at step S13 is registered in the "parent process ID" field of the installation process management table 131. If the parent process ID is registered, the flowchart proceeds to step S17. Otherwise, the flowchart proceeds to step S18.

(S17) The generation unit 150 registers the process ID of the process in question in association with the parent process ID obtained at step S13 in the installation process management table 131. In this case, since the parent process ID is already registered in the installation process management table 131, the generation unit 150 just registers the process ID of the process in question as a child process ID of the parent process ID. The flowchart is then completed.

(S18) The generation unit 150 registers the process ID of the process in question in the "parent process ID" field of the installation process management table 131. For example, a process that may be a parent process, like the installer process Px of the software X, is registered at this step S18. The flowchart is then completed.

(S19) The generation unit 150 collects the information obtained at steps S11 to S14 from the process monitor 141 and file access monitor 142. At this time, the generation unit 150 also obtains information indicating whether the file access made by the process in question is to update (change or generate) the file, from the file access monitor 142. The generation unit 150 determines whether the process ID obtained at step S13 is registered in one of the "parent process ID" and "child process ID" field of the installation process management table 131. If the process ID is registered, the flowchart proceeds to step S20. Otherwise, the flowchart is completed.

(S20) The generation unit 150 registers file information about the accessed file in association with the process ID of the process in question. Referring to the example of the installation process management table 131, in the case where the process in question has a process ID of "1235," the generation unit 150 registers the file information in "file0000.txt."

(S21) In the case where the file access made by the process in question is to update the file, the generation unit 150 registers the file name and update time of the updated file in association with the process ID of the process in question in the component configuration management table 132. If there is no record for the process in question in the component configuration management table 132, the generation unit 150 registers them as a first file update. If information about a first or last update is registered with respect to the process in question, the generation unit 150 registers them as a last file update (overwrites information about a last file or registry update if there is). If the file access made by the process in question is not to update the file (for example, file read or the like), the generation unit 150 may skip this step S21. The flowchart is then completed.

As described above, the server 100 manages the generation status of installer processes (installation processes). The server 100 also manages file access made by the installer processes.

At steps S11 and S13, the process monitor 141 obtains information including the startup time of a process and a parent-child relationship between processes from the OS. For example, in the case where the OS is Windows (registered trademark), information including the startup time of a process, the parent process of a process, and others may be obtained from the OS using Windows Management Instrumentation (wmi), Windows Management Instrumentation Command line (wmic), or the like. In the case where the OS is UNIX (registered trademark) or Linux (registered trademark), information including the startup time of a process, a parent process, and others may be obtained from the OS using a ps command or another command.

Figure 15:
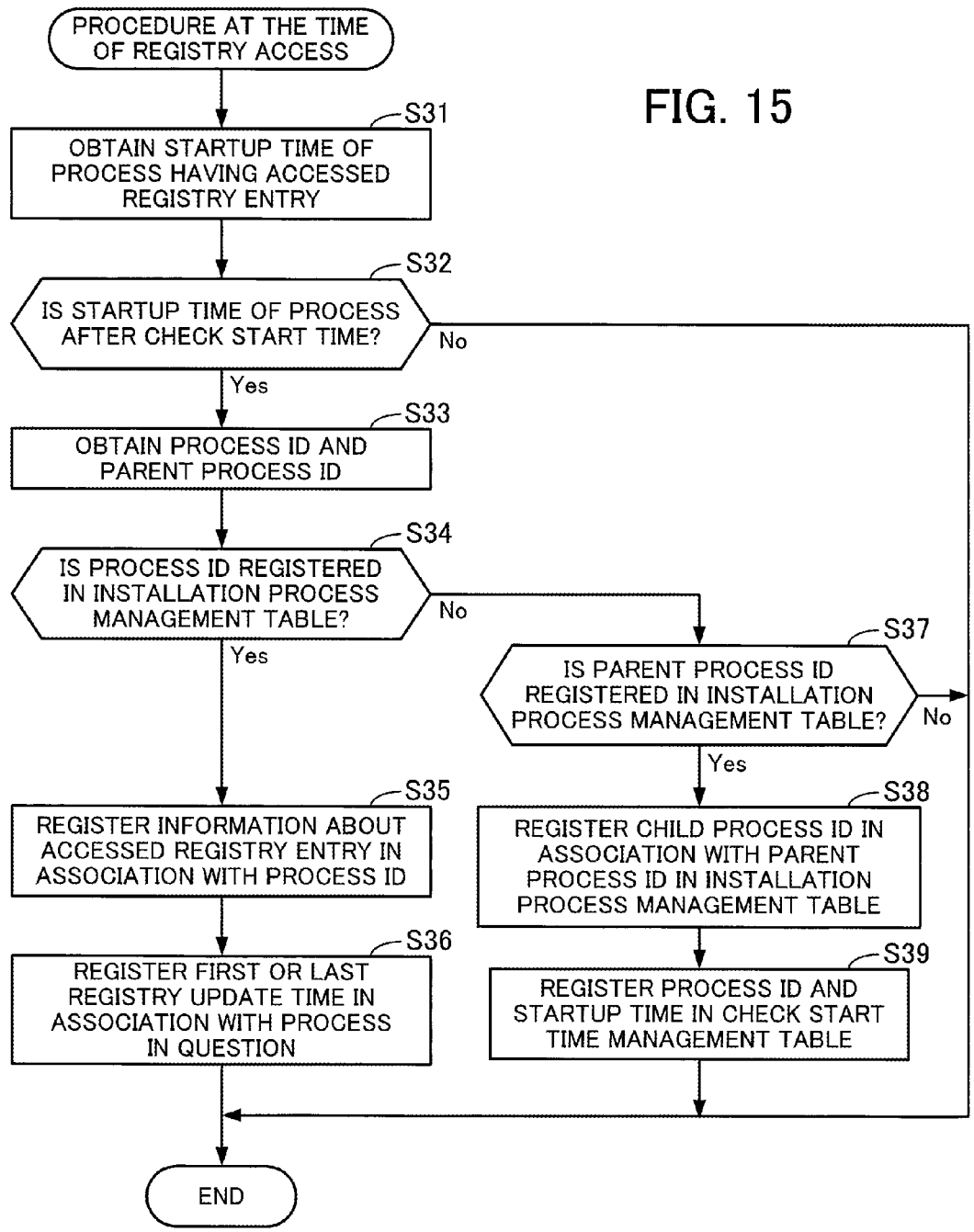
FIG. 15 is a flowchart of exemplary processing steps that are performed when registry access is made.

FIG. 15 is a flowchart of exemplary processing steps that are performed when registry access is made. The processing steps of FIG. 15 will be described step by step. The following procedure corresponds to step S3 of FIG. 13.

(S31) The registry access monitor 143 notifies the process monitor 141 of the process ID of a process having accessed a registry entry. The process monitor 141 obtains the startup time of the process corresponding to the obtained process ID from the OS.

(S32) The process monitor 141 determines with reference to the check start time management table 133 whether the startup time obtained at step S31 is after the earliest one (check start time) of the startup times registered in the check start time management table 133. If the obtained startup time is after the check start time, the flowchart proceeds to step S33. Otherwise, the flowchart is completed.

(S33) The process monitor 141 obtains the process ID (child process ID) of the process in question and the process ID (parent process ID) of the parent process of the process in question. The process monitor 141 is notified of the process ID of the process in question from the registry access monitor 143 at step S31. The process monitor 141 obtains the parent process ID corresponding to the obtained process ID from the OS.

(S34) The generation unit 150 collects the information obtained at steps S31 to S33 from the process monitor 141 and registry access monitor 143. At this time, the generation unit 150 also obtains information indicating whether the registry access by the process in question is to update (change or generate) registry settings, from the registry access monitor 143. The generation unit 150 determines whether the process ID obtained at step S33 is registered in one of the "parent process ID" and "child process ID" fields of the installation process management table 131. If it is registered, the flowchart proceeds to step S35. Otherwise, the flowchart proceeds to step S37.

(S35) The generation unit 150 registers registry information on the accessed registry entry in association with the process ID of the process in question. Referring to the example of the installation process management table 131, in the case where the process ID of the process in question is "1235," the generation unit 150 registers the registry information in "reg0000.txt."

(S36) Since the registry access by the process in question is to update registry settings, the generation unit 150 registers the registry name and update time of the updated registry entry in association with the process ID of the process in question in the component configuration management table 132. If there is no record for the process in question in the component configuration management table 132, the generation unit 150 registers them as a first registry update. If information about a first or last update is registered for the process in question, the generation unit 150 registers them as a last registry update (overwrites information on a last file or registry update if there is). Then, the flowchart is completed. In this connection, if the registry access by the process in question is not to update the registry, the generation unit 150 may skip step S36 and then the flowchart is completed.

(S37) The generation unit 150 determines whether the parent process ID obtained at step S33 is registered in the "parent process ID" field of the installation process management table 131. If it is registered, the flowchart proceeds to step S38. Otherwise, the flowchart is completed.

(S38) The generation unit 150 registers the process ID of the process in question in association with the parent process ID obtained at step S33 in the installation process management table 131. In this case, the parent process ID is already registered in the installation process management table 131, and therefore the generation unit 150 just registers the process ID of the process in question as a child process ID of the parent process ID.

(S39) The process monitor 141 registers the process ID (the child process ID obtained at step S33) and the startup time (the startup time obtained at step S31) of the process in question in the check start time management table 133.

As described above, the server 100 manages registry access by installer processes.

Figure 16:
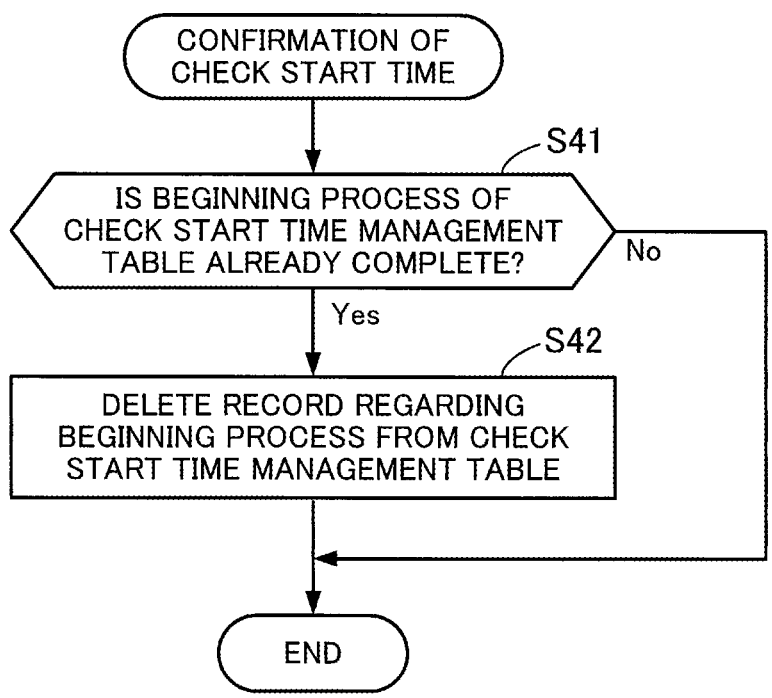
FIG. 16 is a flowchart illustrating an example of how to confirm a check start time.

FIG. 16 is a flowchart illustrating an example of how to confirm a check start time. The processing steps of FIG. 16 will be described step by step. The following procedure corresponds to step S4 of FIG. 13.

(S41) The process monitor 141 determines whether the beginning process of the check start time management table 133 is complete. The beginning process of the check start time management table 133 is a process corresponding to the process ID of a record having the smallest value in the startup order. If the process is complete, the flowchart proceeds to step S42. Otherwise, the flowchart is completed.

(S42) The process monitor 141 deletes the record regarding the beginning process from the check start time management table 133.

As described above, the server 100 updates the check start time to be managed using the check start time management table 133. The determinations at step S12 of FIG. 14 and step S32 of FIG. 15 exclude the file access by processes that are started up before the start of installation of the software X from being treated. This reduces the processing amount of the server 100 and thus the processing load on the server 100.

After that, when the installation of the software X is completed, the generation unit 150 generates the software dictionary table 134 and component configuration management dictionary table 135 on the basis of the installation process management table 131 and component configuration management table 132, and stores them in the software configuration information storage unit 130.

More specifically, the generation unit 150 identifies software that is a suite product and its software components on the basis of the relationships between a parent process ID and child process IDs registered in the installation process management table 131. For example, the generation unit 150 identifies files updated by each process on the basis of the file information corresponding to the process. The generation unit 150 then identifies information such as the software name (product name) and the manufacturer of the software corresponding to each process with reference to the headers of the files updated by the process. In addition, the generation unit 150 is able to recognize the installation order of the software components on the basis of the update times of files and registry entries updated by the software components, as exemplified in FIG. 12.

Further, the generation unit 150 generates the time interval table 136 on the basis of the component configuration management table 132 and stores the time interval table 136 in the software configuration information storage unit 130. More specifically, the generation unit 150 obtains the first and last update times of files and registry entries updated by each software component of the software X from the component configuration management table 132. Therefore, the generation unit 150 is able to calculate the time intervals ΔT1 and ΔT2 for installing the software and then calculate the average time interval and standard deviation from these time intervals, as exemplified in FIG. 12.

The generation unit 150 sends the generated software dictionary table 134, component configuration dictionary table 135, and time interval table 136 to the management server 200.

The management unit 220 receives the software dictionary table 134, component configuration management dictionary table 135, and time interval table 136 and stores them in the storage unit 210. Thereby, the information on the software X is stored in the storage unit 210. In this connection, the management unit 220 stores the information on the software X in association with the identification information of the server 100, so as to manage that the software X has been installed on the server 100.

The following description defines a software dictionary as containing the same information as the software dictionary table 134 for a plurality of suite products. In addition, a component configuration management dictionary is defined as containing the same information as the component configuration management dictionary table 135 for the plurality of suite products.

By doing so, the management unit 220 is able to check the identity of software installed on a certain server (for example, server 100) and other servers (for example, server 100a) on the basis of the software dictionary stored in the storage unit 210.

Figure 17:
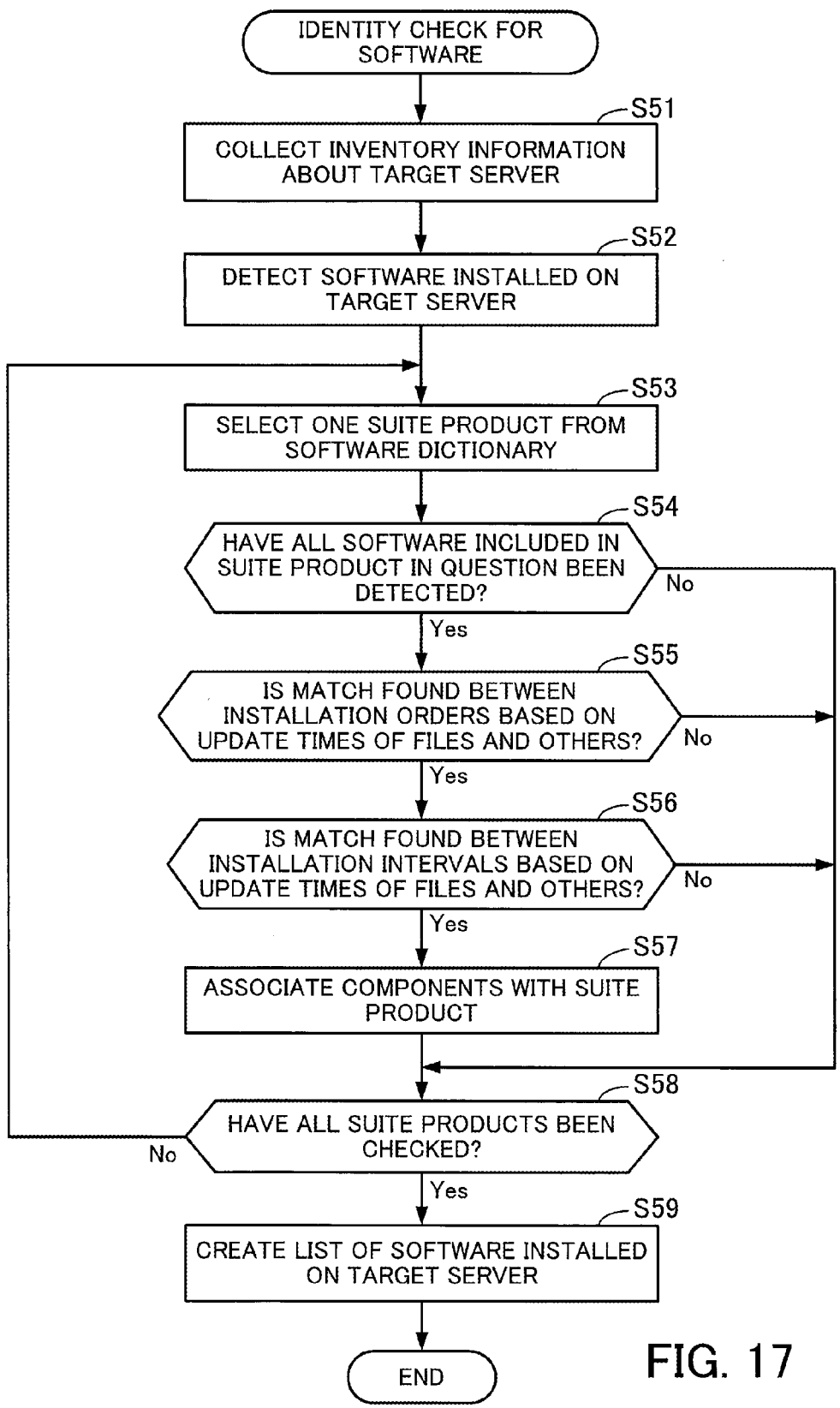
FIG. 17 is a flowchart illustrating an example of how to check the identity of software.

FIG. 17 is a flowchart illustrating an example of how to check the identity of software. The processing steps of FIG. 17 will be described step by step. The following describes the case of checking whether software installed on the server 100a and software registered in the software dictionary are the same.

(S51) The management unit 220 collects inventory information from the server 100a. The inventory information includes file information and registry information about software installed on the server 100a.

(S52) The management unit 220 compares the obtained inventory information with the file information and registry information of the software dictionary stored in the storage unit 210 to detect software installed on the server 100a. Referring to the example of the software dictionary table 134, it is confirmed that, when the software A is installed, the files indicated in the file information "file0000A.txt" and the registry settings indicated in the registry information "reg0000A.txt" are generated. Therefore, if all of the files indicated in the file information "file0000A.txt" and the registry settings indicated in the registry information "reg0000A.txt" are included in the files and registry settings indicated in the inventory information of the server 100a, it means that the software A has been installed on the server 100a. The same applies for the other software.

(S53) The management unit 220 selects one software suite product (a suite product to be in question) from the software dictionary stored in the storage unit 210. For example, the management unit 220 selects software X.

(S54) The management unit 220 determines based on the detection results obtained at step S52 whether all the software included in the suite product in question has been detected. If all the software included in the suite product in question has been detected, the flowchart proceeds to step S55. If there is software that has not been detected in the suite product in question, the flowchart proceeds to step S58. For example, assume the case where the suite product in question is the software X. If all of the software X, A, B, and C has been detected from the inventory information of the server 100a, the flowchart proceeds to step S55. If at least one of the software X, A, B, and C has not been detected, the flowchart proceeds to step S58.

(S55) The management unit 220 obtains the names of files and registry entries updated first and last by the software components of the suite product in question with reference to the component configuration management dictionary stored in the storage unit 210. Then, the management unit 220 specifies the installation order of the software detected at step S54 on the basis of the update times of the files and registry entries indicated in the inventory information of the server 100a collected at step S51. The installation order is specified in the same way as described with reference to FIG. 12.

More specifically, the inventory information of the server 100a includes the update times of files and registry entries. This enables the management unit 220 to recognize in which time zone each software was installed on the server 100a, and specifies the installation order of the software on the server 100a on the basis of the time series of the installations. The management unit 220 determines, with reference to the component configuration management dictionary stored in the storage unit 210, whether the installation order previously obtained for the suite product in question matches the installation order obtained from the inventory information of the server 100a. If they match, the flowchart proceeds to step S56. Otherwise, the flowchart proceeds to step S58. In the case of the software X, as an example, it is recognized from the component configuration management table 135 that the software A, B, and C is installed in the order of A, B, and C. If it is recognized from the inventory information of the server 100a that the software A, B, and C was installed in the order of A, B, and C, it means that these installation orders match.

(S56) The management unit 220 obtains, with reference to the component configuration management dictionary stored in the storage unit 210, the names of files and registry entries updated first and last by the software components of the suite product in question. Then, the management unit 220 calculates the time intervals between the installations of the software detected at step S54 on the server 100a, on the basis of the update times of the files and registry entries indicated in the inventory information collected at step S51. The time intervals are calculated in the same way as explained with reference to FIG. 12. The management unit 220 determines, with reference to the time interval table 136 stored in the storage unit 210, whether each calculated time interval and the average time interval already obtained for the suite product in question match within a predetermined error margin. If they match, the flowchart proceeds to step S57. Otherwise, the flowchart proceeds to step S58. For example, in the case where the suite product in question is the software X, the management unit 220 calculates each time interval ($\Delta T1$, $\Delta T2$) between the installations of the software A, B, and C on the server 100a. For example, if each calculated time interval is smaller than the value calculated by (already obtained average time interval for software X)+(standard deviation)× 2, the management unit 220 finds a match therebetween. If each calculated time interval is larger than or equal to that calculated value, the management unit 220 determines no match.

(S57) The management unit 220 determines that the suite product in question has been installed on the server 100a, and associates all the software detected at step S54 with the suite product selected at step S53. That is, the management unit 220 creates a software group including the software detected at step S54.

(S58) The management unit 220 determines whether all the suite products registered in the software dictionary stored in the storage unit 210 have been selected and checked at step S54 and subsequent steps. If all of the suite products have been confirmed, the flowchart proceeds to step S59. If at least one of the suite products has not been checked, the flowchart proceeds back to step S53. In this connection, at the subsequent step S53, one of the unselected suite products is selected.

(S59) The management unit 220 creates a list of software installed on the server 100a on the basis of the associations obtained at step S57. For example, the user is able to confirm the suite products and their software components, installed on the server 100a, with reference to the created list of software. For example, the user is able to confirm that the software X as a suite product and the software A, B, and C as the components of the software X have been installed on the server 100a.

As described above, the management server 200 is able to confirm whether software installed on the servers 100, 100a, and 100b and software registered in the software dictionary are the same. At this time, the management server 200 is able to confirm not only the identity of software itself but also the software components of the software.

Especially, the determinations at steps S55 and S56 make it possible to identify suite products correctly. More specifically, the installation order of a suite product reflects the control by the installer for the suite product, and if certain software was installed in a different order, it means that that the software is not a suite product. In addition, if some software is installed at relatively long time intervals, it is determined that the software is not components of a suite product.

In this connection, any of the servers 100, 100a, and 100b may be provided with the functions of the management unit 220. That is, any of the servers 100, 100a, and 100b may create a software group at step S57.

Figure 18:
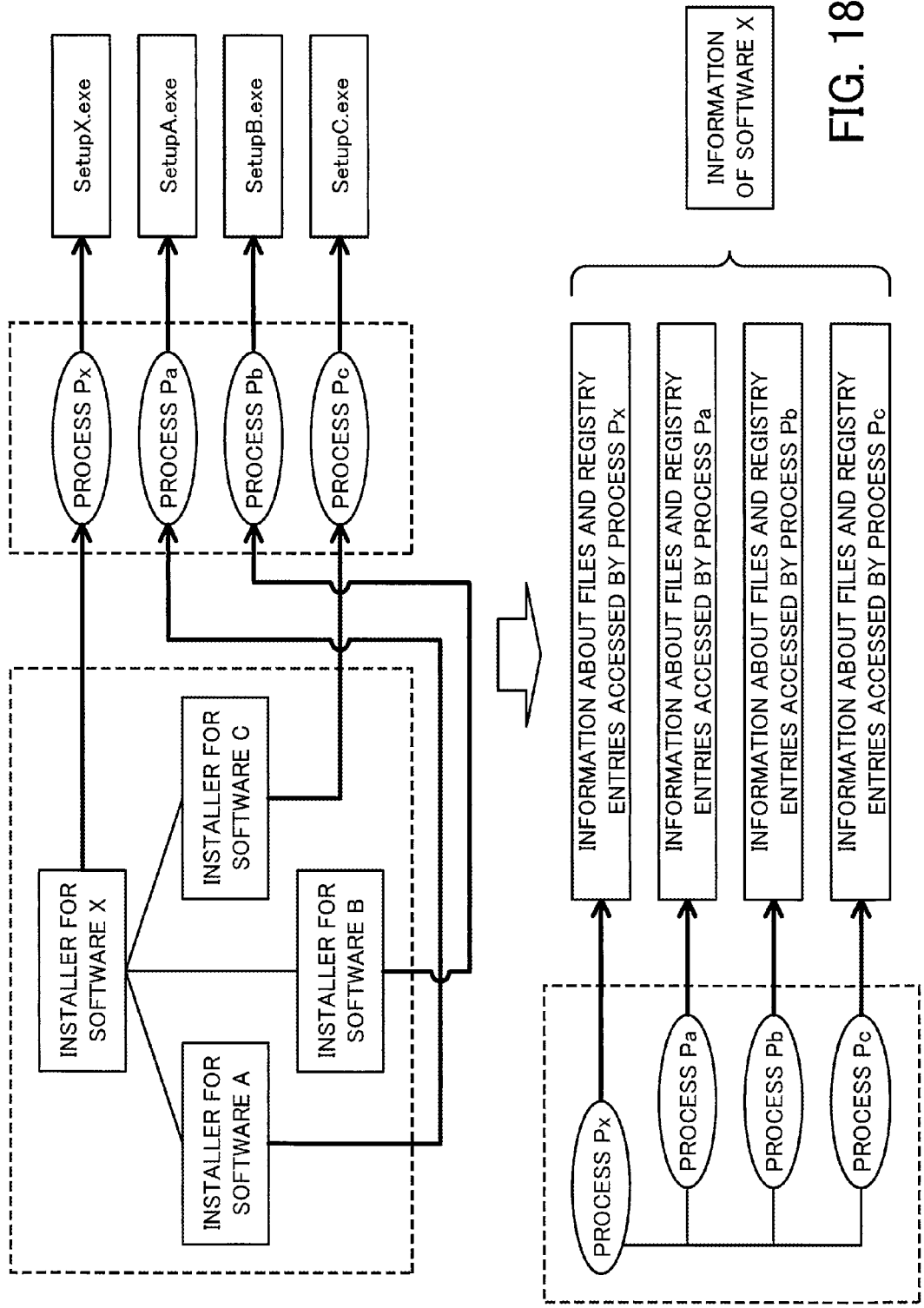
FIG. 18 illustrates an example of detection of a suite product.

FIG. 18 illustrates an example of detection of a suite product. For example, when the software X is installed on the server 100, the OS of the server 100 generates a process Px to execute the installer for the software X. The process Px is used to execute an installer program "SetupX.exe" of the software X. The process Px accesses various files and registry entries during the installation.

Then, the installer for the software X sequentially calls the installers for the software A, B, and C to install the software A, B, and C. That is, the process Px generates a process Pa to execute the installer ("SetupA.exe") for the software A. The process Px also generates a process Pb to execute the installer ("SetupB.exe") for the software B. Furthermore, the process Px generates a process Pc to execute the installer ("SetupC.exe") for the software C. The processes Pa, Pb, and Pc access various files and registry entries during the installation.

In this case, on the basis of the parent-child relationships between the processes Px, Pa, Pb, and Pc, information on the files and registry entries accessed by the processes Pa, Pb, and Pc, which are the child processes of the process Px, is associated as the information of the software X. In addition, the processes Pa, Pb, and Pc correspond to the software A, B, and C, respectively. Therefore, the software A, B, and C is managed as a software group that is bundled in a suite product, i.e., the software X.

That is, the server 100 specifies the processes Px, Pa, Pb, and Pc generated according to execution of the software X on the basis of the parent-child relationships between the plurality of processes. The server 100 generates software configuration information associating the information about files and registry entries accessed by the processes Px, Pa, Pb, and Pc with the software X.

FIGS. 19A and 19B illustrate examples of checking the identity of software. FIG. 19A exemplifies identity check for software using a software dictionary generated with the method of the second embodiment. FIG. 19B illustrates a comparison example that does not use the method of the second embodiment. Here, a difference between software X and X' is considered. Both of the software X and X' include software B and C. A difference between the software X and X' is that the software X includes software A and the software X' includes software A' that is a bug fixed version of the software A.

As illustrated in FIG. 19A, according to the software dictionary generated in the second embodiment, information about the software A is included in information about the software X, and information about the software A' is included in information about the software X'. Therefore, a difference between the software A and A' is identified as a difference between the software X and X' which are suite products.

By contrast, in the case where software is not associated with any suite product, the software is managed individually in a software dictionary. Then, as illustrated in FIG. 19B, even if a difference between the software A and A' is recognized, this difference may not be identified as a difference between the software X and X'.

For example, in the case where the servers 100, 100a, and 100b perform the same processing, it may be desired that the exactly same software is installed on these servers in order to keep the stable operation of the system. However, if the software is managed individually, as illustrated in the example of FIG. 19B, only a difference between the software A and A' installed on servers is recognized. That is to say, it is not possible to recognize whether the software A and A' was installed as individual products or as components of a suite product. Therefore, it may be difficult to determine whether to replace the software A with the software A' or to replace the software X, which is a suite product, with the software X', in order that the servers have the exactly same software installed.

By contrast, with the method of the second embodiment, it is possible to appropriate identify a difference between the software A and A' as a difference between the software X and X' in the case where the software A and A' are components of the software X and X', which are suite products, respectively. For example, if a problem is detected with certain software, it is possible to easily recognize the area of influence (single software basis or suite product basis) of the problem and to thereby take appropriate countermeasures. As a result, it is possible to efficiently manage software in order to keep the stable operation of the system.

Figure 20:
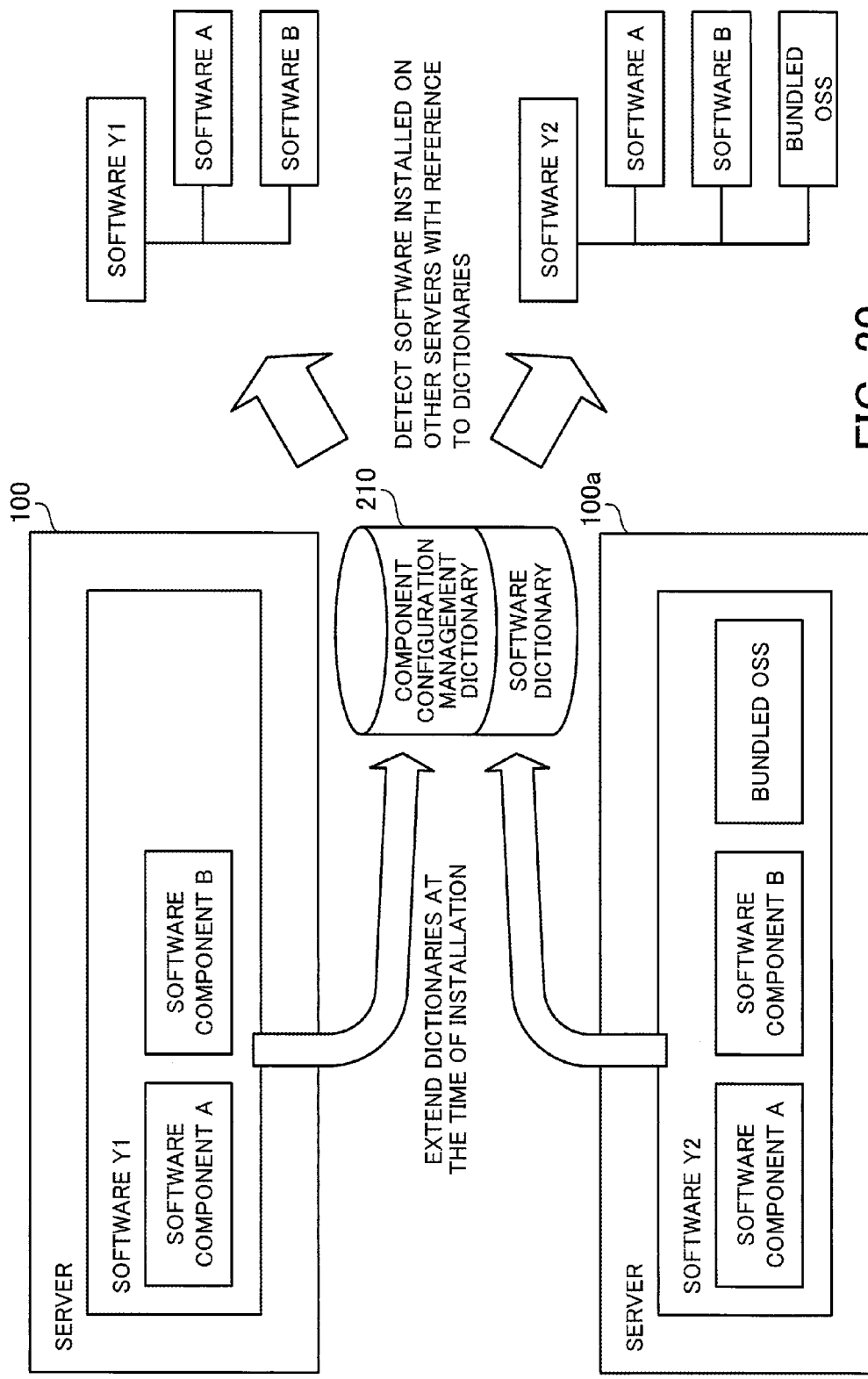
FIG. 20 illustrates an exemplary extension of a software dictionary.

FIG. 20 illustrates an exemplary extension of a software dictionary. For example, information about software Y1 may not be registered in a software dictionary stored in the storage unit 210 of the management server 200. In this case, the server 100 adds the information about the software Y1 to the software dictionary when the software Y1 is installed. Assuming that the software Y1 includes software components A and B, the server 100 registers the relationships between the software Y1 and the software A and B and the file and registry information about each software in the software dictionary and component configuration management dictionary stored in the storage unit 210 when the software Y1 is installed.

Similarly, the server 100a adds information about software Y2 to the software dictionary and the component configuration management dictionary. For example, the software Y2 includes the software components A and B, and OSS (Open Source Software) bundled therewith (hereinafter, referred to as bundled OSS). In this case, the server 100a registers the relationships between the software Y2, and the software A and B and bundled OSS, and the file and registry information about each software in the component configuration management dictionary and software dictionary when the software Y2 is installed.

Thereby, the management server 200 comes to be able to detect the software Y1 and Y2 installed as suite products on other servers, with reference to the component configuration management dictionary and software dictionary stored in the storage unit 210.

Especially, there are a countless number of pieces of OSS and free software, and such OSS or free software may not be registered in advance in a software dictionary. The method of the second embodiment makes it possible to register such OSS and free software as the software components bundled in suite products in the software dictionary. In addition, even if a suite product that is a bundle of OSS or free software is installed on another server, it is possible to detect the software without fail using the software dictionary extended as described above. In addition, for example, it is possible to appropriately distinguish the case where OSS or other software is installed irrespective of a suite product and the case where a bundle of OSS or other software is installed as a suite product.

In this connection, any of the servers 100, 100*a*, and 100*b* may be provided with the functions of the management unit 220, which eliminates the need of providing the management server 200.

In addition, the above examples use the case where software is installed on the servers 100, 100*a*, and 100*b*. The software may be installed on virtual machines. For example, even in the case where the software X is installed on a virtual machine running on the server 100, the functions of the monitoring unit 140 and generation unit 150 may be implemented by using the virtual machine. With the same method as the second embodiment, it is also possible to check the identity of software installed on a plurality of virtual machines.

In this connection, the information processing of the first embodiment may be implemented by causing the operation unit 1*b* to run a program. In addition, the information processing of the second embodiment may be implemented by causing the processor 101 to run a program. Such a program may be recorded in the computer-readable recording medium 13.

For example, to distribute the program, the recording media 13 on which the program is recorded may be put on sale. Alternatively, the program may be stored in another computer and may be distributed over a network. A computer may store (install) the program recorded in the recording medium 13 or the program received from the other computer in a storage device, such as the RAM 102 or HDD 103, and may read and run the program from the storage device.

According to one aspect, it is possible to manage the files and settings of managed computers in association with software.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a software information management program that causes a computer to execute a procedure comprising:
   monitoring a plurality of processes generated by an installer for software when the software is installed to the computer; and
   generating software configuration information based on a plurality of file information, the plurality of file information being about a plurality of files, respectively, that are accessed by the plurality of processes, and relationships between the plurality of processes, the software configuration information associating the plurality of file information with the software.

2. The non-transitory computer-readable storage medium according to claim 1, wherein the generating includes associating a plurality of registry information about registry entries accessed by the plurality of processes with the software.

3. The non-transitory computer-readable storage medium according to claim 1, further comprising creating a software group with reference to the software configuration information.

4. The non-transitory computer-readable storage medium according to claim 3, wherein the creating includes creating the software group based on update times of files or setting data.

5. A software information management apparatus comprising:
   a memory which stores programs of software; and
   a processor which executes a procedure including:
      monitoring a plurality of processes generated by an installer for the software when the software is installed; and
      generating software configuration information based on a plurality of file information, the plurality of file information being about a plurality of files, respectively, that are accessed by the plurality of processes, and relationships between the plurality of processes, the software configuration information associating the plurality of file information with the software.

6. A software information management method comprising:
   monitoring, by a computer, a plurality of processes generated by an installer for software when the software is installed; and
   generating, by the computer, software configuration information based on a plurality of file information, the plurality of file information being about a plurality of files, respectively, that are accessed by the plurality of processes, and relationships between the plurality of processes, the software configuration information associating the plurality of file information with the software.

* * * * *